United States Patent [19]
Cook et al.

[11] 3,804,267
[45] Apr. 16, 1974

[54] BALE WAGON

[75] Inventors: Albert C. Cook, Kingsburg; Donald M. Grey, Selma, both of Calif.

[73] Assignee: Sperry Rand Corporation, New Holland, Pa.

[22] Filed: Apr. 3, 1972

[21] Appl. No.: 240,472

[52] U.S. Cl. .............................. 214/8.5 K, 214/6 B
[51] Int. Cl. ........................................... B65g 59/08
[58] Field of Search .......... 214/6 B, 8.5 K, 508, 520

[56] References Cited
UNITED STATES PATENTS
3,502,230  3/1970  Grey.................................... 214/6 B
3,638,808  2/1972  Grey.................................... 214/6 B

*Primary Examiner*—Robert G. Sheridan
*Assistant Examiner*—George F. Abraham
*Attorney, Agent, or Firm*—Frank A. Seemar; John R. Flanagan; Joseph A. Brown

[57] ABSTRACT

A bale wagon, of the single bale unloading type, having a load carrying bed overlying a chassis structure and including an unloading table pivotally mounted adjacent one end of said load bed. The load bed is provided with a rolling rack adapted to move fore-and-aft towards said unloading table such that a tier at a time is pushed from said load bed onto said unloading table where the tier is unloaded from the bale wagon, one bale at a time. For powering the unloading table a hydraulic cylinder is provided and controlled by a control valve that is operative to station the unloading table at any one of an infinite number of unloading positions adjacent the end of the load bed, thereby allowing the unloading table to be adjustably positioned relative to the particular ground elevation on which the bale wagon is disposed.

Also, during the single bale unloading operation, a metering device is employed in conjunction with the unloading cylinder and is controlled during the single bale unloading operation to raise the unloading table from its particular selected unloading position to a tier receiving position closely adjacent the end of the stack disposed on the load bed, such that the tier being pushed from the load bed onto the unloading table falls only a relatively short distance uncontrolled, thereby avoiding the situation where the bales tend to spill out from the tier in those cases where the tier has to fall from the load bed all the way down to where the unloading table assumes the unloading position.

12 Claims, 19 Drawing Figures

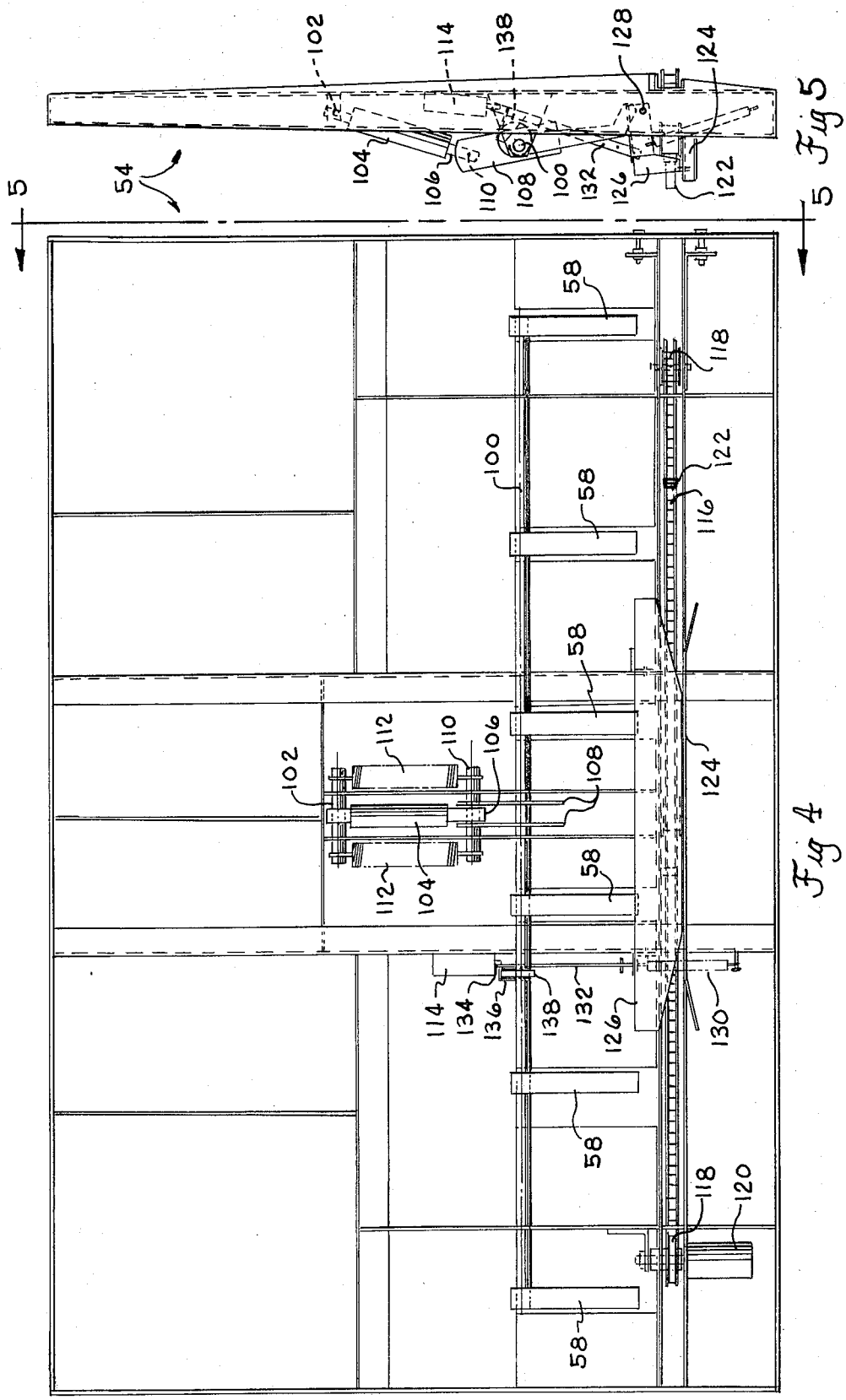

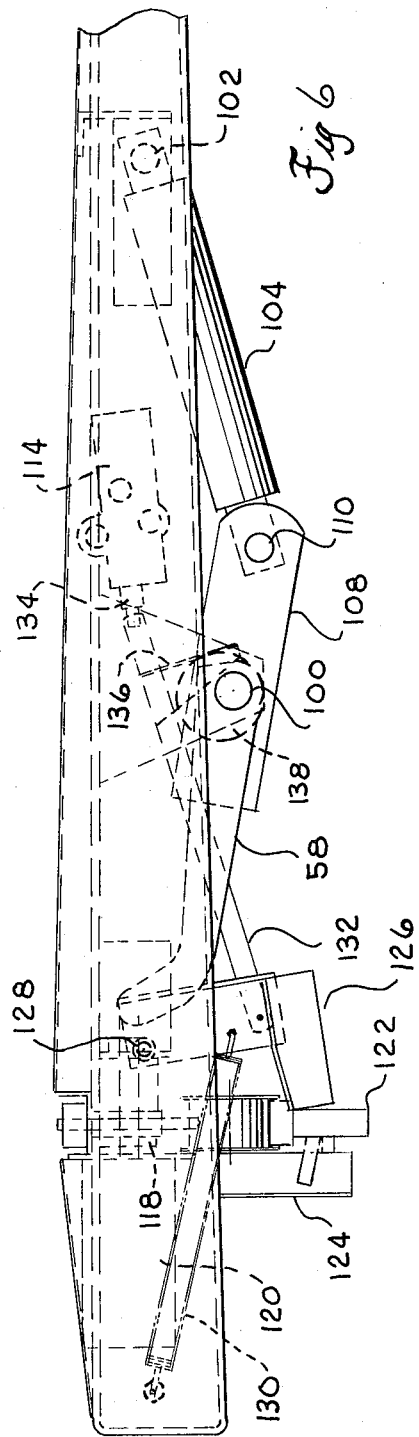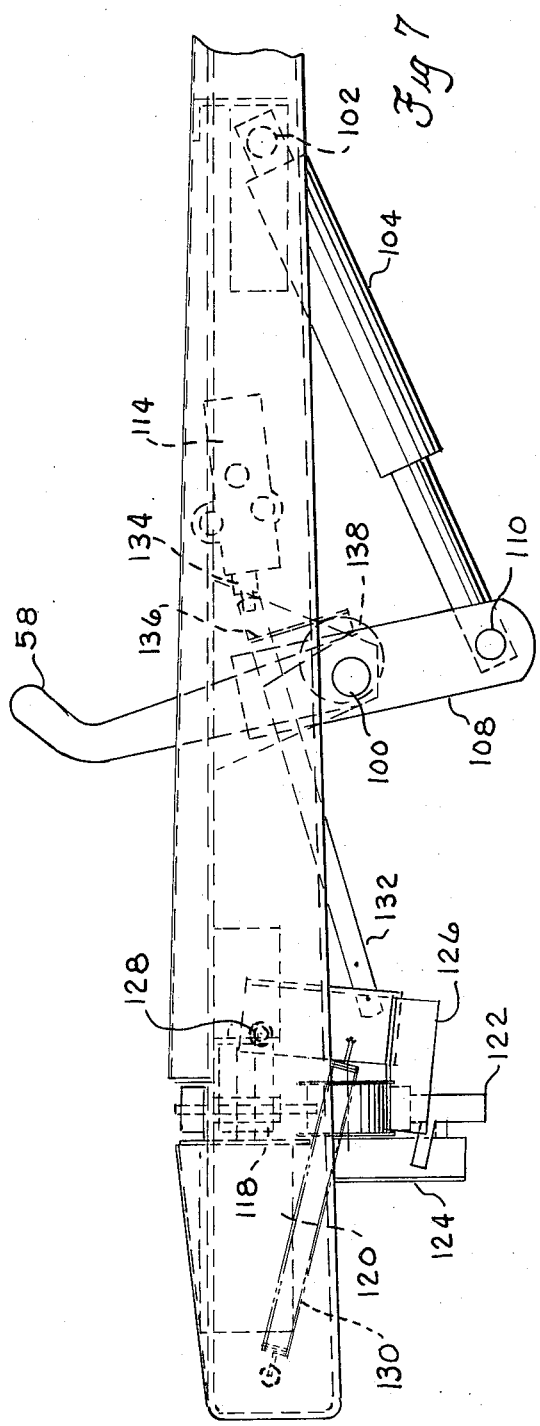

BALE WAGON

BACKGROUND OF THE INVENTION

The present invention relates to bale wagons and more particularly to the bale wagons of the general single bale unloading type which are adapted to unload bales from a composite stack, one bale at a time.

In the last three years hay farmers here in the United States have been introduced to a single bale unloading bale wagon of the type shown and described in U.S. Pat. No. 3,502,230 granted to D. M. Grey et al. on Mar. 24, 1970, hereafter referred to as the basic Grey single bale unloading patent. The single bale unloading wagon shown in the above referred to Grey patent includes a load bed that is adapted to support and carry a composite stack of bales comprised of a plurality of tiers disposed in side-by-side relationship. Also, the same Grey bale wagon includes an unloading table pivotally mounted about a front portion of the load bed, the unloading table having an unloading mechanism for unloading individual bales from a tier disposed thereon. Moveably supported on the load bed is what is referred to as a rolling rack, the rolling rack being particularly adapted during single bale unloading to push the entire stack towards the unloading table such that a tier at a time departs the stack and falls onto the unloading table. Before the single bale unloading operation is commenced, the unloading table is raised to an up position and then lowered onto a table support or prop which supports the unloading table at an angle to the stack and load bed. Assuming a level terrain condition, the unloading table is customarily set at an angle of approximately 32 degrees to a reference line extending generally parallel to the ground.

In many cases, however, the ground terrain is not in a level condition. Therefore, it is obvious that the use of the prop to station the unloading table for single bale unloading, stations the table relative to the bale wagon chassis structure and not with respect to the general level of the ground terrain on which the single bale unloading operation is to be carried out. Thus, the unloading table is sometimes stationed such that the center of gravity of the tier disposed thereon is directed nearly normal to the plane of the unloading table, thereby giving rise to only a minimal force component in the plane of the unloading table. In such cases, the tier tends to resist sliding down on the unloading table which is necessary in separating individual layers from the tier, as each time after a layer has been conveyed from the table, the remaining tier portion must slide down the unloading table such that the hooks may be re-employed to separate another portion of the tier from a single layer. If, on the other hand, the unloading table is stationed at a substantial angle, the bales tend to roll down instead of sliding down.

Moreover, in the basic Grey single bale unloading wagon it will be observed that in transferring individual tiers from the load bed to the unloading table, that the tier must free fall through a substantial space. Generally, this has been acceptable in smaller bale wagons such as the basic Grey single bale unloading wagon, but in larger capacity bale wagons the massiveness of the individual tiers has made it difficult to apply the Grey free falling approach as the momentum gained during free fall makes it difficult to contain the tier as it impacts against the unloading table. In many instances, upon impact the individual bales of the tier bounce from the unloading table, spilling outwardly from the bale wagon.

SUMMARY OF THE INVENTION

Applicant's invention relates to a three table bale wagon which is adapted to pick up bales from the field and form the bales into a composite stack on a load bed overlying a chassis structure. Moreover, the present bale wagon includes an unloading table, sometimes referred to as a second or transfer table, pivotally mounted adjacent one end of the load bed and particularly provided with a single bale unloading mechanism for unloading bales therefrom one bale at a time. The unloading table is powered by a hydraulic cylinder and is controlled via a control valve that may be selectively actuated to trap various volumes of fluid within the hydraulic cylinder such that the unloading table may be stationed at various angles relative to the end tier of the stack adjacent the unloading table.

The load bed is further provided with a rolling rack that is hydraulically powered in a fore-and-aft direction towards said unloading table by another hydraulic cylinder. The hydraulic cylinder of the rolling rack is also selectively controlled by a control valve, referred to as both a central single bale unloading control valve and a rolling rack control valve, and by selectively actuating this control valve, the rolling rack may be powered towards the unloading table such that a portion of the stack carried by the load bed is pushed off the edge of the load bed adjacent the unloading table, the stack portion preferably being a tier and the stack consequently being comprised of a series of tiers disposed in side-by-side relationship.

To control the movement of a tier from the load bed onto the unloading table during the single bale unloading operation, a novel hydraulic control means has been devised by applicants to recycle the unloading table from the normal stationary single bale unloading position to a tier receiving position, the tier receiving position being in close proximity to the tier disposed on the end of the load bed adjacent the unloading table. The control means of the hydraulic system is particularly adapted to actuate the rolling rack forward towards the unloading table in response to the unloading table reaching this tier receiving position, such that the tier is not pushed from the load bed until the unloading table is in close proximity thereto, thereby minimizing the space in which the tier has to fall and thereby avoiding the disadvantages that were associated with the basic Grey type single bale unloading bale wagon discussed above.

In particular the manner of sequentially controlling the unloading operation in which a tier at a time is transferred from the load bed to the unloading table comprises a unique metering device disposed between the rolling rack control valve and the unloading table hydraulic cylinder. The rolling rack cylinder is provided with flow restricting means to insure that upon the selective actuation of the rolling rack control valve, fluid will be first diverted into the metering device which displaces fluid therein into the unloading table cylinder, causing the unloading table to pivot back up towards the stack to the tier receiving position. Once the unloading table has reached the tier receiving position, the flow restricting means to the rolling rack cylinder is overcome and fluid is then diverted into the rolling rack cylinder causing it to move towards said unloading table and to push a tier at a time onto the unloading table.

It is therefore the principal object of the present invention to provide a single bale unloading bale wagon that overcomes the disadvantages of the prior art.

It is also a major object of the present invention to provide a single bale unloading bale wagon having a moveable unloading table that may be selectively stationed, independently of the bale wagon's chassis structure, at an infinite number of positions adjacent a load carrying bed having a stack of bales thereon, thereby enabling the unloading table to be adjusted so as to take into account the ground terrain of the single bale unloading site.

More specifically, in a single bale unloading bale wagon having a load bed adapted to support a stack of bales including a plurality of tiers disposed in side-by-side relationship, an unloading table pivotally mounted adjacent one end of said load bed and adapted to assume a stationary unloading position, a hydraulic cylinder for powering said unloading table and means for transferring a tier at a time from said load bed to said unloading table, it is another object to provide in such a bale wagon a manually actuated control valve for the unloading table cylinder that by selective actuation traps various volumes of fluid in said unloading table cylinder, thereby positioning said unloading table at various selected positions relative to the stacks supported by said load bed.

A further principal object of the present invention is to provide in a single bale unloading bale wagon a tier retriever system that facilitates the orderly transfer of tiers from the load bed to the unloading table without requiring each tier to free fall through a substantial space between the stack and the unloading table.

Another object of the present invention is to provide in a single bale unloading bale wagon an unloading table that is adapted to recycle during single bale unloading from a normal stationary tier unloading position to a tier receiving position closely adjacent the next tier to be transferred, thereby minimizing the free fall of the next tier to be transferred.

A further object of the present invention is to provide a bale wagon with a rolling rack that is adapted to move the stack of bales supported by the load bed towards said unloading table automatically in response to the unloading table assuming the tier receiving position, thereby causing a tier at a time to depart the load bed and be received by the closely adjacent unloading table.

It is another object of the present invention to provide control means for sequentially recycling the unloading table and automatically actuating the rolling rack.

A further object of the present invention is to provide an external hydraulic power source fluidly connected to a hydraulic cylinder for powering the unloading table, and providing means for actuating said external hydraulic power source such that the fluid contained therein is displaced against the cylinder of the unloading table causing the latter to recycle from its normal stationary unloading position to a tier receiving position.

A more particular object of the present invention resides in the provision of a hydraulic control means interconnected between the hydraulic cylinder of the unloading table and the hydraulic cylinder of the rolling rack for controlling the sequential operation of the unloading table and rolling rack.

More specifically, it is the object of the present invention to sequentially control the unloading table cylinder and the rolling rack cylinder through one control single bale unloading control valve, and in particular it is the object of the present invention to provide a metering device between the central control valve and the unloading table cylinder and to further provide flow restricting means into the rolling rack cylinder such that flow is first diverted from the central control valve into the metering device causing the unloading table to recycle from its stationary unloading position to a tier receiving position, and upon the unloading table reaching the tier receiving position substantial pressure is built up between the control valve and the metering device to overcome the flow restricting means to the rolling rack cylinder, thereby allowing flow of fluid to enter the rolling rack cylinder which gives rise to the stack being pushed towards the unloading table and causing a tier at a time to be pushed therefrom onto the unloading table.

Other objects and advantages of the present invention will become apparent and obvious from a study of the following description and the accompanying drawings which are merely illustrative of the present invention.

A BRIEF DESCRIPTION OF THE DRAWINGS

FIG. 4 is a plan view of the underside of the unloading table, showing particularly the control system for controlling the bale separating hooks during the single bale unloading operation.

FIG. 5 is a view taken through the line 5—5 of FIG. 4.

FIGS. 6 and 7 are enlarged side elevational views of the unloading table showing the control system for the bale separating hooks, with FIG. 6 showing the bale separating hooks in the down or non-engaged position and FIG. 7 showing the bale separating hooks in the up or tier engaged position.

DESCRIPTION OF THE PREFERRED EMBODIMENT

Figure 1:
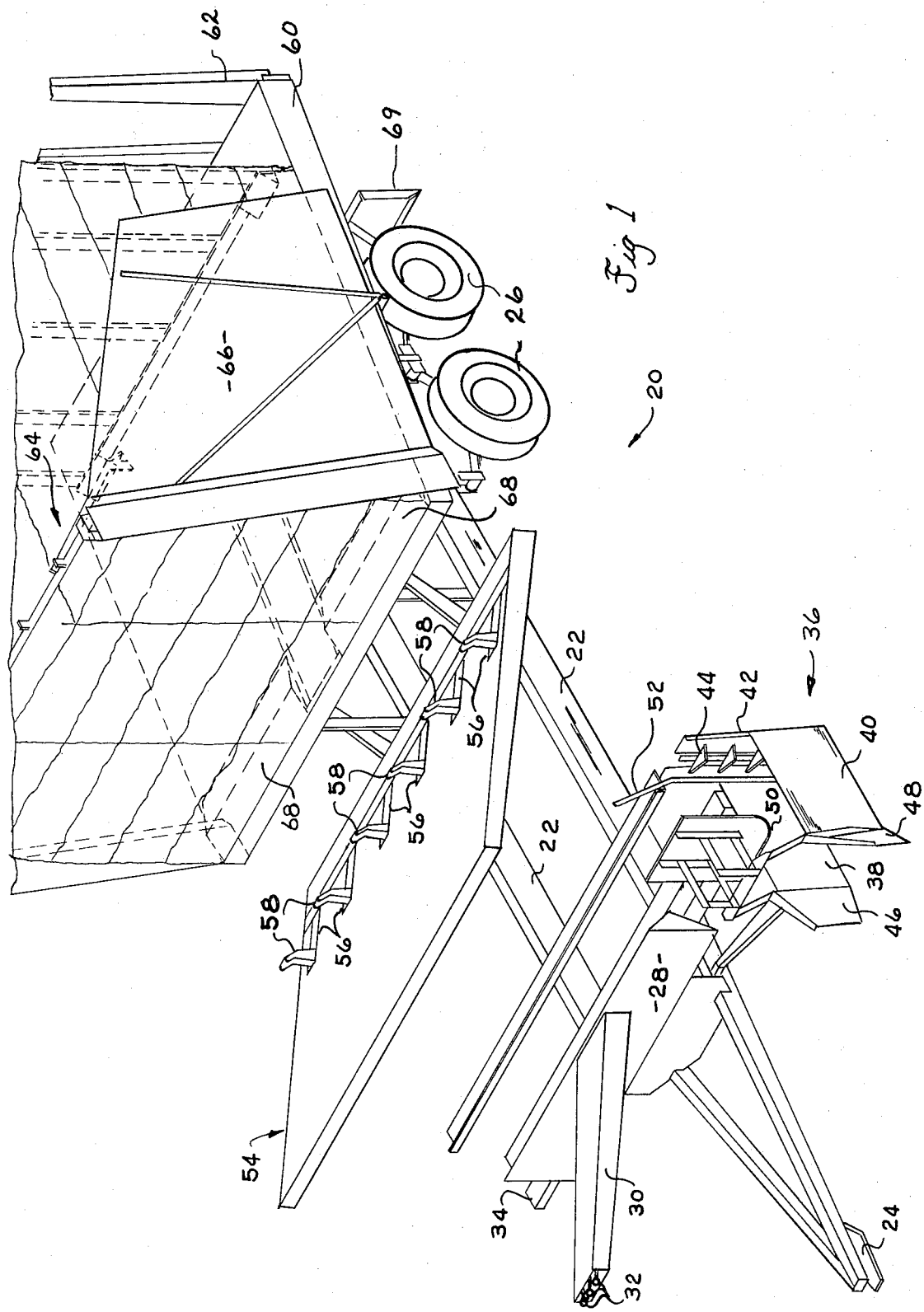
FIG. 1 is a perspective view of a single bale unloading bale wagon drawn in accordance with the present invention.

With reference to the drawings, particularly FIG. 1, a bale wagon of the three table single bale unloading type is shown therein and indicated generally by the numeral 20. The bale wagon 20 comprises a generally fore-and-aft extending chassis structure 22 which includes a front clevis 24 adapted to be connected to a tractor such that the bale wagon 20 may be pulled through the field. Rotatively mounted on each side of the chassis structure 22, near the rear, is a pair of ground engaging wheels 26.

Viewing the front of the bale wagon 20, it is observed that a panel structure 28 is transversely mounted about the front portion thereof and includes a generally forwardly extending shroud 30, the shroud tending to support a plurality of controlled handles 32 which extend therefrom. Although the particular connections of the control handles 32 is not shown, it is well appreciated in the art that bale wagons of the type shown herein are normally hydraulically powered and that such control handles are connected to selected control valves such that the operator may manually control these particular valves from the tractor seat.

Figure 16:
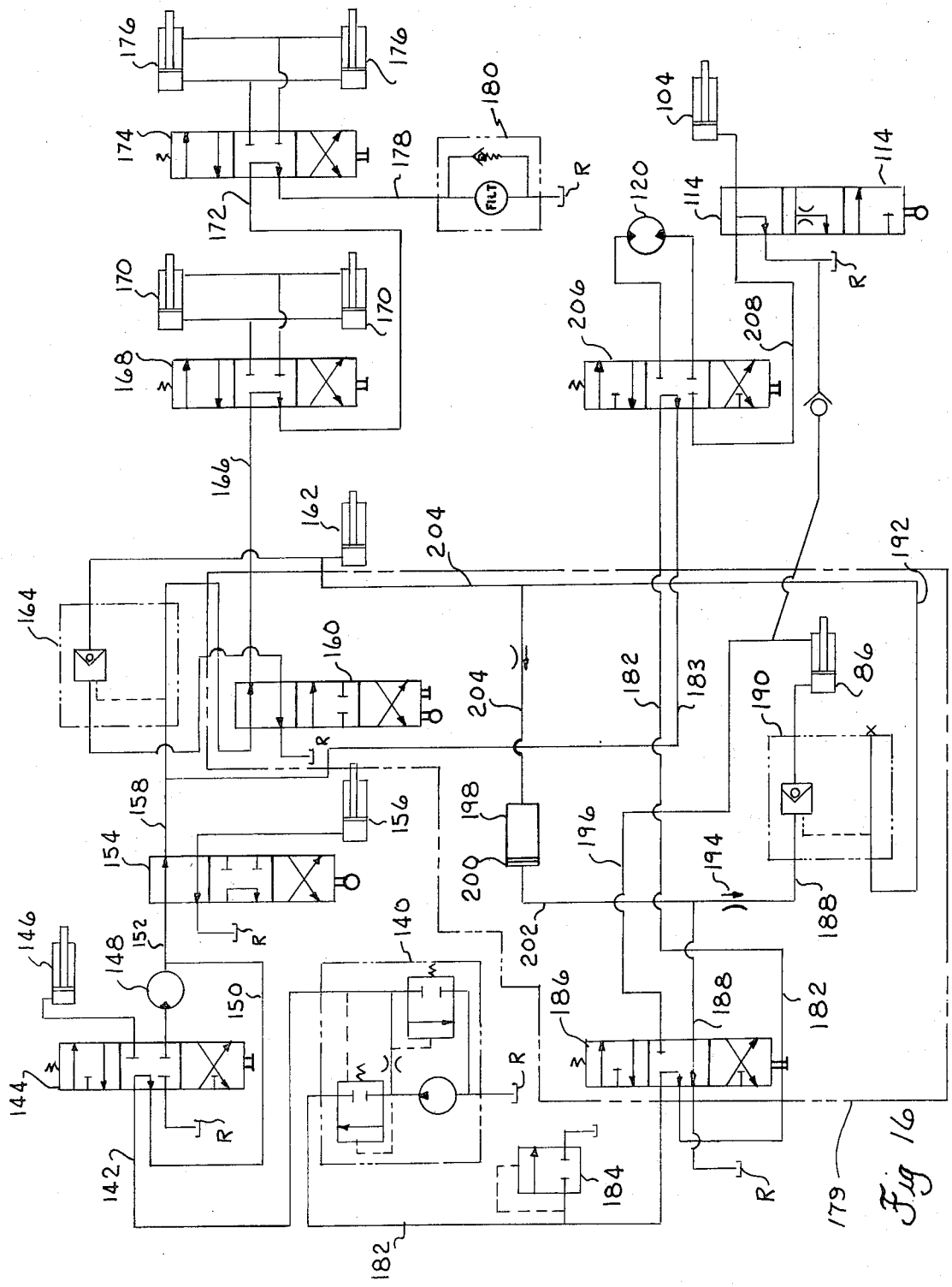
FIG. 16 is a diagrammatic illustration of the hydraulic circuitry employed by the bale wagon of the present invention.

Spaced rearwardly of the panel structure 28 is a generally transversely extending receiving table 34, the receiving table, although not particularly shown, is of the conventional type inasmuch as it is pivotally mounted about a transverse axis and is powered thereabout by a single acting hydraulic cylinder, not shown in FIG. 1 but illustrated in the hydraulic circuitry of FIG. 16 and denoted therein by the numeral 156.

Offset to one side of the receiving table 34 is a bale loader 36 which in the normal course of operation serves to pick up bales from the field and deliver them to the receiving table 34. Viewing the bale loader 36 in greater detail, it will be observed that the bale loader comprises a pair of laterally spaced generally vertically extending side walls 38, 40. The side walls 38, 40 are joined in the rear by a back wall 42 which includes a generally vertically extending conveyor 44 powered therein. Extending forwardly in diverging relationship from each of the side walls 38, 40 is a pair of guide plates 46, 48. The presence of the guide plates 46, 48 insure that bales that are slightly out of alignment with the bale loader 36 will be guided between the side walls thereof. Mounted on the top front portion of the bale loader 36 is a bale shoe 50 which tends to hold the bales being elevated upwardly closely adjacent to the elevator 44 and, therefore, greatly enhances the loading characteristics of the bale loader. To deflect the bales from the bale loader 36 onto the receiving table 34 a deflector rod 52 is mounted on the top portion of the outside wall 40 and is in general alignment with the receiving table 34 such that bales leaving the bale loader are properly directed towards the receiving table. Also, not particularly shown in FIG. 1, is a hydraulic cylinder for moving the bale loader between operative and transport positions and an orbit hydraulic motor for powering the elevator 44. These two components of the bale loader 36 will be discussed when summarizing the hydraulic system as shown in FIG. 16.

Pivotally mounted about a transverse axis rearwardly of the receiving table 34 is an unloading table indicated generally by the numeral 54, the unloading table being sometimes referred to as a second or transfer table. The unloading table 54 includes a series of openings 56 laterally spaced about the rear portions of the table and further includes a like number of bale separating hooks 58 that are moveably mounted to project through the openings 56 during particular periods of the single bale unloading operation. A detailed description of the bale separating hooks 58 and the manner of controlling will be forthcoming in the present disclosure.

Overlying the rear of a chassis 22 is a load rack or load bed 60, the load bed also being pivotally mounted about a transverse axis that extends generally parallel to the axis of rotation of both the receiving table 34 and unloading table 54. The load bed 60 includes a plurality of laterally spaced generally upstanding finger structure 62 mounted about the rear edge thereof. Disposed about the front portion of the load bed 60 is a tine arch mechanism, indicated generally by the numeral 64. A detailed description of the tine arch mechanism 64 will not be presented herein as the structure thereof is well-known in the art, as evidenced in U.S. Pat. No. 3,620,384, and forms no material part of the present invention. But generally it may be pointed out that the main function of the tine arch mechanism 64 is to stabilize the individual tiers being transferred from the unloading table 54 to the load bed 60 during the operation. During the single bale unloading operation, the tine arch mechanism is actuated such that the tines are pivoted up to a clearance position such that the tiers of the stack being pushed from the load bed to the unloading table 54 may pass thereunder without interference with the tines. To stabilize the stack of bales being carried by the load bed 60 and to further confine the load thereon, a pair of side boards 66 is mounted on opposite sides of the load bed in spaced apart relationship. Provided about the front terminal edge of the load bed 60 is a pair of laterally spaced unloading ramps 68, the unloading ramps being the subject matter of a presently pending U.S. Pat. application Ser. No. 216,386, filed Jan. 10, 1972. The ramps principally function during the single bale unloading operation to shift the center of gravity of the entire tier being unloaded such that the tier being transferred from the load bed to the unloading table remains in a unitary posture and does not spill out from the bale wagon in the process. Bale wagon 20 is further provided with a pair of hydraulically powered push-off feet 69 which cooperate with the load bed in the stacking of a load of bales carried by the load bed 60.

Figure 2:
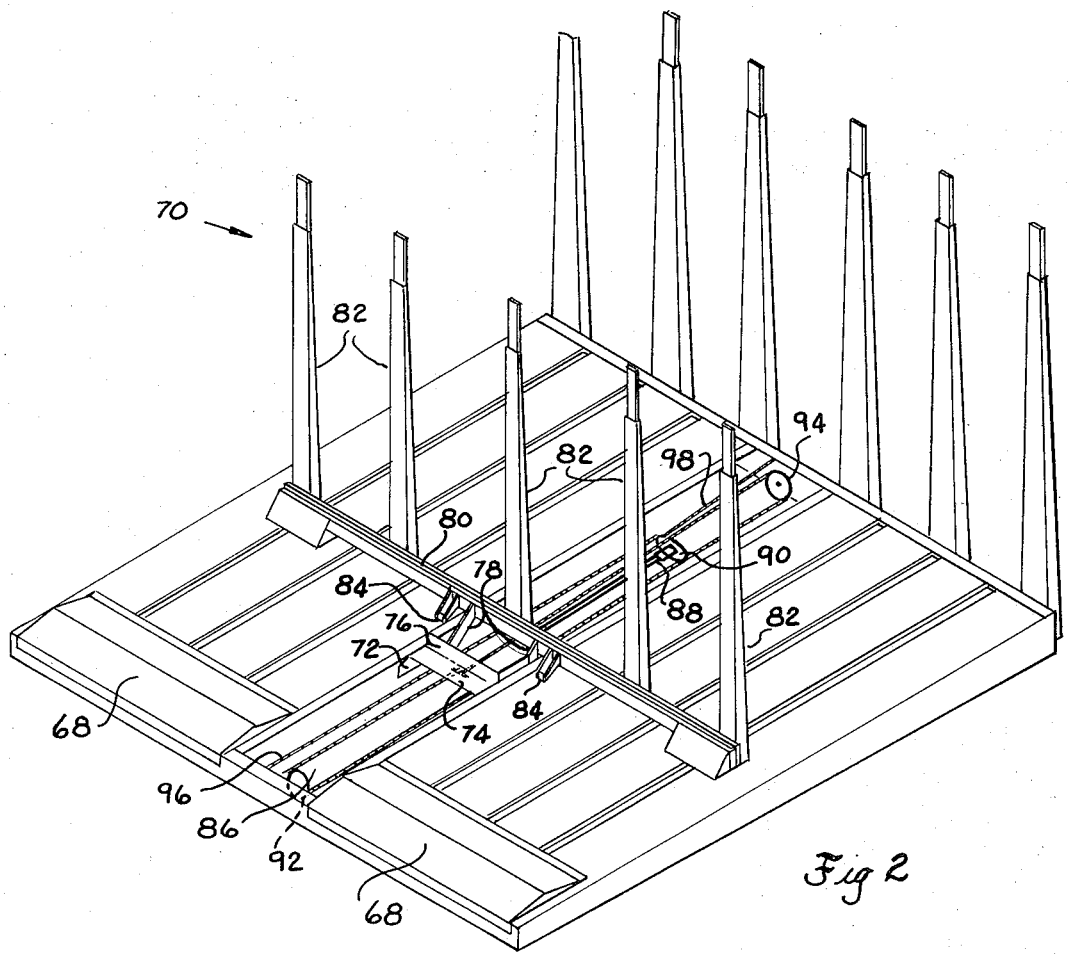
FIG. 2 is a perspective view of a rolling rack and load bed assembly for the single bale unloading bale wagon of the present invention.

As will become apparent from a complete study of the present disclosure, the present invention relates basically to single bale unloading and by "single bale unloading" one means the unloading of a stack of bales from a support structure, one bale at a time. In carrying out single bale unloading it becomes necessary to move the entire stack such that the individual tiers thereof may be transferred from approximately the same location on the load bed. The present disclosure, as shown in FIG. 2, utilizes a rolling rack indicated generally by the numeral 70 to push the entire composite stack towards the front terminal edge of the load rack 60. The rolling rack 70 is a fairly conventional rolling rack inasmuch as the structure thereof is quite similar to that used in the basic Grey single bale unloading bale wagon disclosed in U.S. Pat. No. 3,502,230. But in the way of a general description it will be observed from FIG. 2 that the rolling rack 70 is disposed transversely of the load rack 60 and comprises a carriage that is moveable fore-and-aft along the general longitudinal center line of the load rack. In particular, the carriage includes a pair of laterally spaced guide rails 72 interconnected by a base plate 74, with the guide rails being provided with a series of rollers that engage and move on a track structure formed within the central portion of the load rack 60. Formed about the base plate 74 is a neck structure 76 that includes a pair of laterally spaced arms 78 pivotally mounted thereto. Fixed to the arms 78 and extending transversely across the load rack 60 is a transverse support member 80. Fixed to said transverse support member 80 in lateral spaced apart relationship and extending generally upwardly therefrom is a series of rolling rack fingers 82. Disposed on each side of the rolling rack carriage is rollers 84, each roller being rotatively supported by a pair of brackets extending from the transverse support member 80. Each roller 84 is particularly spaced to engage the unloading ramp structure 68 disposed along the front terminal edge of the load rack 60, causing the arms 78 and fingers 82 to tip forwardly.

The main power source for actuating the rolling rack fore-and-aft along the load rack is a hydraulic cylinder 86 anchored to the front of the load rack and extending generally rearwardly therefrom about a central portion thereof. The cylinder 86 includes a rod end 88 that carries a double pulley 90. Also, stationed at opposite ends of the load rack 60 is a front pulley 92 and a rear pulley 94. A first cable 96 has one end fixed to the front of the load rack and extends rearwardly therefrom where a portion thereof is trained around one of the pulleys of the double pulley 90 and returned to the front where another portion of the first cable 96 is trained around front pulley 92 with the other end thereof being fixed to the rolling rack carriage. A second cable 98 is fixed to the rear of the load rack 60 and extends forwardly therefrom where a portion thereof is trained around the other pulley of the double pulley 90, and trained back around rear pulley 94 from where the cable extends forwardly where the other end thereof connects to the same carriage. Thus, it is seen that the extension of rod end 88 causes cable 96 to be pulled rearwardly, which causes the rolling rack 70 to move towards the front terminal edge of the load rack 60. In reverse manner, the retraction of the rod end 88 causes cable 98 to be pulled towards the front, causing the rolling rack 70 to be propelled to the rear of the load rack 60. During the single bale unloading operation, it will be appreciated that the rolling rack 70 will be disposed at the rear of the stack carried by the load bed. Thus, by extending the rod end 88 of the rolling rack cylinder 86 in small increments, the rolling rack is brought forward in proportional increments, causing a tier at a time to be moved from the load rack to the unloading table 54.

With particular reference to FIGS. 4–7, the unloading table 54, the bale separating hooks 58 and the control mechanism therefore is shown. In particular, it is seen that the bale separating hooks are secured in lateral spaced apart relationship on a transversely extending rockshaft 100, the rockshaft being rotatively mounted on the underside of the unloading table 54. The rockshaft 100 and consequently the bale separating hooks 58 are actuated back and forth by a single acting hydraulic cylinder 104 which has an anchor end secured to a cross shaft 102 that is in turn secured to the underside of the unloading table 54. The cylinder 104 includes a rod end 106 that extends generally towards the rockshaft 100, and fastened between the rod end 106 and the rockshaft 100 is a pair of connecting plates 108. Thus, as the rod end of the cylinder 104 is actuated the rockshaft 100 is rotated by the pair of connecting plates 108. A second cross shaft 110 is transversely held by the rod end 106 and the rod end of the cylinder is normally biased to a retracted position by a pair of springs 112 that extend along each side of the cylinder 104 and are connected between the two cross shafts 102, 110.

Spaced below the bale separating hooks 58 is a transversely extending cross conveyor 116, the cross conveyor being trained around sprockets 118 that are laterally spaced and rotatively mounted within the lower portion of the unloading table 54. Mounted adjacent one of the cross conveyor sprockets 118 is a fluid hydraulic orbit motor 120 which is operatively connected to the same sprocket for driving the same and consequently driving the cross conveyor 116.

Operatively related between the cross conveyor 116 and the hydraulic cylinder 104 for actuating the hooks 58, is a control linkage and valve mechanism for controlling the bale separating hooks in relationship to the movement of the cross conveyor 116. In particular, this control mechanism includes a pair of spaced apart paddles 122 extending from the cross conveyor 116. Fixed to the underside of the unloading table 54 and disposed in the path of the cross conveyor 116 and the paddles 122 is a stationary guide plate 124 whose opposite ends are flanged outward from the path of the cross conveyor and paddles to assure smooth engagement between the paddles 122 and stationary guide plate 124. Disposed alongside of the stationary guide plate 124 and also in the path of the paddles 122 is a moveable actuator plate 126, the actuator plate being pivotally mounted about a transverse axis 128 (FIG. 5) and normally biased by a spring 130 to abut against the stationary plate 124. Spaced from the actuator plate 126 is a control valve 114 which is operatively connected to the hydraulic cylinder 104 for directing fluid to and from thereto. The control valve 114 includes a valve spool 134 that is operatively connected to the actuator plate 126 through a connecting link 132. Mounted on the connecting rod 132 in the vicinity of the rockshaft 100 is a cam following bracket 136. Aligned with the cam following bracket 136 and secured to the rockshaft 100 is a cam 138 which is particularly adapted to engage the cam following bracket as the rockshaft is rotated and the bale separating hooks 58 are moved from their normal non-engagement position below the unloading table to the tier engaging position, as shown in FIGS. 6 and 7 respectively.

Turning briefly to FIG. 16 and the hydraulic circuitry diagram of the present bale wagon, it will be observed therefrom that the hook cylinder control valve 114 generally diverts the flow of fluid thereto back to the reservoir when in the top normal position. This top position corresponds to the position occupied by the valve spool when the actuator plate 126 is separated from the stationary guide plate 124 by the presence of the paddles 122, as best seen in FIG. 6. As the cross conveyor 116 is actuated the paddles 122 will move from between the actuator plate 126 and the stationary guide plate 124 and because of the presence of the spring 130 the actuator plate 126 is biased to move against the stationary guide plate 124, causing the valve spool 134 to shift to a lower position. The shifting of the hook cylinder control valve 114 to the lower position causes the flow of fluid thereto to be diverted into the anchor end of hook cylinder 104 causing the rod end 106 to be extended and the bale separating hooks 58 to project through the openings 56 and to engage a portion of the tier overlying the top of the unloading table 54. As the bale separating hooks 58 are actuated the cam 138 engages the cam following bracket 136, tending to center the valve spool 134. Because of the metering characteristics of the valve spool between the lower and center position the valve spool acts as a pressure compensator, tending to maintain pressure against the piston of the hook separating cylinder 104 while diverting fluid under pressure through the valve back to the reservoir R. The pressure against the piston of the hook cylinder 104 naturally keeps the bale separating hooks 58 in the tier engaged position (FIG. 7). Once the leading paddle 122 has made one revolution, it again separates the actuator plate 126 from the stationary guide plate 124 causing the hook cylinder control valve 114 to be shifted to the up position, as particularly viewed in FIG. 16. This, of course, results in the relief of pressure being applied to the hook cylinder 104 and allows the fluid therein to return back to reservoir R under the influence of springs 112.

HYDRAULIC SYSTEM

Turning to FIG. 16, a hydraulic circuitry diagram is shown therein illustrating the various components of the bale wagon's hydraulic system. It should be noted that each of the components of the hydraulic system is shown in FIG. 16 in the normal no-load position. Generally, the hydraulic system illustrated in the present disclosure is made up of two basic parts, the first part relating to the hydraulic components that are utilized primarily during the loading and stacking operations and the second part being those hydraulic components that are used primarily in the single bale unloading operation.

First with respect to those components that relate to loading, stacking, etc., it is seen that fluid flow originates from a pump indicated by the numeral 140. Pump 140 includes an integral priority valve which delivers fluid to a priority line 142. Priority line 142 is operatively connected to a manually actuated loader valve 144 which is operative to supply fluid to either the loader cylinder 146 or to an orbit motor 148, the orbit motor being operatively connected to the bale elevator 44 for powering the same during the loading operation. When control valve 144 is in the normal spring centered position, flow from the line 142 is directed into priority line 150 which bypasses the orbit motor 148 and joins line 152, line 152 being directed into a control valve 154 which controls the operation of the receiving table 34 through a single acting hydraulic cylinder 156. In the normal top position, as viewed in FIG. 16, flow is directed from line 152 through control valve 154, into line 158 which runs through lock-out valve 164 into a control valve 160, the control valve 160 being both mechanically and manually actuated for directing the fluid into the anchor end of a single acting hydraulic cylinder 162 which is utilized to power the unloading table 54. In the normal no-load position fluid is directed from the unloading table control valve 160 into line 166 which leads to a manually actuated control valve 168 which controls the pivotal movement of the load rack 60 through two hydraulic double acting cylinders 170. From the load rack control valve 168, fluid may be directed into control valve 174 via line 172, control valve 174 being operatively connected to a pair of hydraulic double acting cylinders 176 which are utilized to actuate the push-off feet 69 that are shown in FIG. 1. For the sake of explanation, it may be pointed out that the control of the load rack control valve 168 and the push-off feet control valve 174 may be controlled by the operator from the tractor seat through the control handles 32 that extend forwardly and upwardly from the front of the bale wagon 20 to the operator's station. Also, it should be pointed out that from the control valve 174 fluid may be directed into line 178 which passes through a filter unit, indicated by numeral 180, and which includes a relief valve parallel to the filter such that the flow of fluid therethrough may circumvent the filter in the case of clogging or the like. From the line 178 and the filter unit 180 flow is then directed into the reservoir R. This completes a general description of the components and the relationship of each to the other that are utilized during the loading and stacking operation. A detail analysis of the operation is not presented herein because such is basically immaterial to the present invention. But it should be noted that the hydraulic circuitry just described is not materially different from the known hydraulic systems presently used in bale wagons that are capable of picking up bales, forming the bales into a load and stacking the entire load on the ground or in a storage area.

Next, one is directed to the second basic part of the hydraulic system which deals primarily with the single bale unloading operation. Here, as in the loading circuit, the flow of fluid originates with the pump 140 and the single bale unloading components are served through a secondary line 182 leading from the pump. The secondary line 182 is provided with a relief valve 184 and leads into the initial portion of control means 179 the central single bale unloading control valve 186. Control valve 186 may be termed the rolling rack control valve but is the central single bale unloading control valve of the control mean 179 because it must be actuated before the single bale unloading operation can be commenced. Extending from the central control valve 186 into the rod end of the rolling rack cylinder 86 is a fluid line 196. Also, extending from the central control valve 186 is a line 188 which runs through lockout valve 190 into the anchor end of the rolling rack cylinder 86. It should be noted that line 188 further includes a one-way flow restricting device 194 which acts to restrict the flow of fluid from the valve 186 to the anchor end of the rolling rack cylinder 86. Extending from line 188 from a point between control valve 186 and the flow restricting device 194 is a line 202 which leads into a metering device 198. The metering device 198 includes an axially slideable piston 200 which is normally disposed on the side of the metering device joining line 202. Continuing to refer to FIG. 16 it is seen that line 204 leads from the side of the metering device 198 opposite line 202 into the anchor end of the single acting hydraulic cylinder 162 of the unloading table. It is further noted that line 192 extends between line 204 and lockout valve 190 and functions as a pilot pressure line in actuating the lockout valve.

When control valve 186 is normally centered flow is directed therefrom through line 182 into control valve 206 which is employed to control the flow of fluid to and from the orbit cross conveyor motor 120. And in the normal spring-centered position, flow is directed via line 183 back into the loading and stacking circuit. In either the top or bottom position, as reviewed in FIG. 16, valve 206 directs fluid into orbit motor 120. In either instance fluid leaving motor 120 is directed into line 208 that leads to the hook cylinder control valve 114 which, as previously noted, is disposed on the underside of the unloading table 54 (FIG. 4). The control valve 114 is, of course, adapted to actuate the hook control cylinder 104 in response to the dictates of the control mechanism disposed between the cross conveyor and the control valve 114 (FIG. 4).

Figure 3:
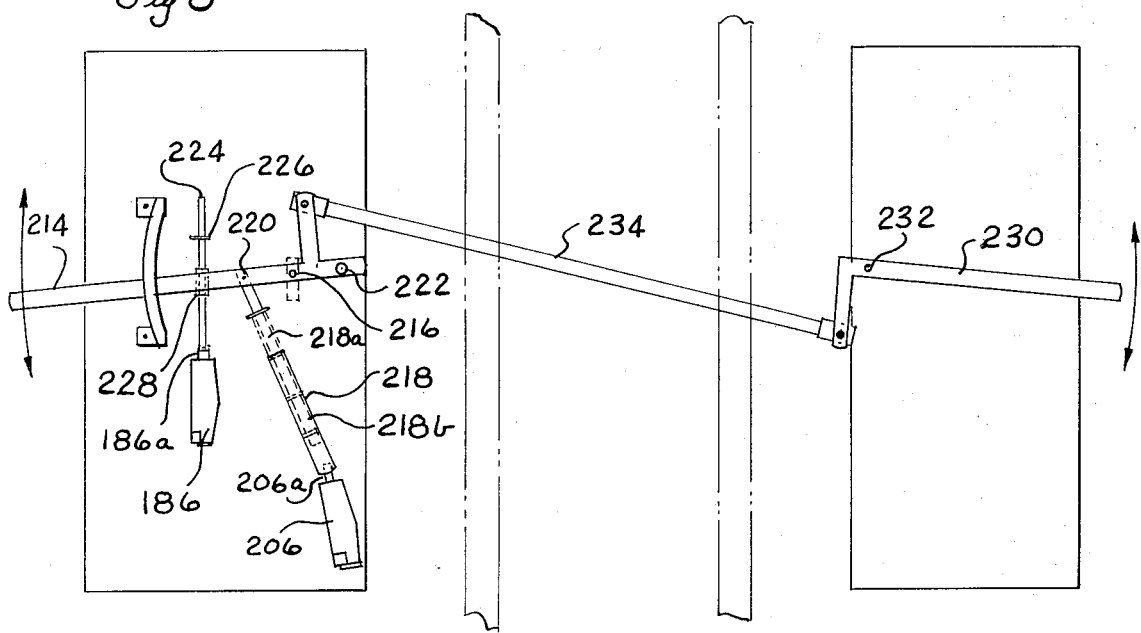
FIG. 3 is a view of the manual single bale unloading control system.

FIG. 3 shows the basic manual control system for actuating control valves 186 and 206. This manual control system comprises a first handle 214 pivotally mounted about axis 216. Handle 214 may be connected at either of two points 220, 222 to a spool 206a extending from control valve 206 by a connecting link 218. Connecting link 218 includes a pair of overrunning springs 218a, 218b. Each spring (218a, 218b) is operative to actuate control valve 206 in response to the movement of the connecting link 218, while allowing the connecting link 218 to overrun as the control handle 214 is continued to be pivoted. It is noted that the valve spool 206a may be shifted in two general directions simply by changing the point of connection between the connecting link 218 and the handle 214. Also, disposed adjacent the control handle 214 is a rod 224 having a stop 226 fixed thereon, the rod 224 being operatively connected to a spool 186a extending from the body of control valve 186 which as discussed above is the central control valve for single bale unloading. A collar 228 is slideably contained around the rod 224 and is fixed to handle 214. Since control valve 186 is spring centered, by stroking the control handle in the direction of the arrow in FIG. 3, the collar 228 engages the stop 226 which causes the valve spool to be shifted to the down position, as shown in FIG. 16, which causes the single bale unloading operation to commence. In stroking the control handle 214 to shift valve 186, it is apparent that valve 206 is also actuated, but no fluid is directed to the latter valve (valve 206) since valve 186 takes priority and diverts the flow to the components it controls. Moving control handle 214 a slight distance away from valve 186 causes valve 186 to center, but because of the overrunning springs 218a, 218b valve 206 remains actuated and fluid is diverted thereto for operating the orbit motor 120.

In order that the single bale unloading operation may be controlled from either side of the bale wagon a second control handle 230 is pivotally mounted about axis 232 on the side of the bale wagon opposite the first handle 214. The second handle 230 is connected to the first handle 214 by a cross link 234, and it is seen from FIG. 3 that the stroking of the second handle 230 in the same general direction as the first handle 214 results in the two control valves 186 and 206 being actuated in the same manner as if the operator was stroking the other control handle 214.

OPERATION

Figure 8:
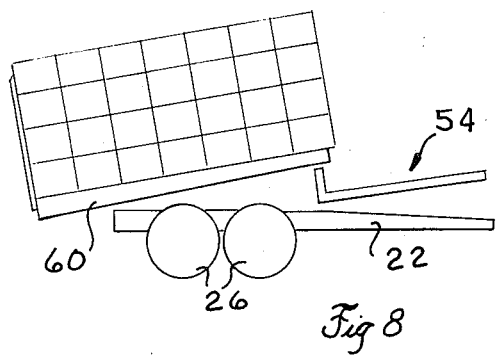
FIGS. 8–15 are schematic illustrations of the single bale unloading operation of the present bale wagon.
Figure 9:
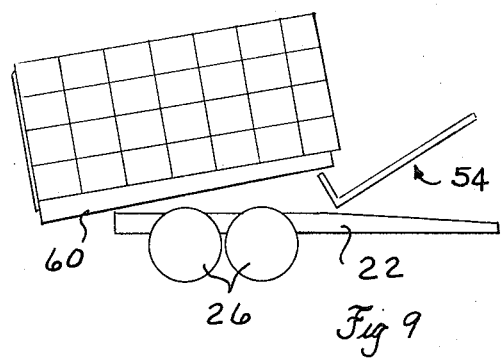

As previously noted the loading operation is not particularly material to the present invention, but it should be understood that the type of bale wagon disclosed in the present application is capable of moving through the field, picking up bales therefrom and loading the bales on the bale wagon. Briefly summarizing the loading operation, it will be observed that bales are picked up by the bale loader 36 and elevated upwardly onto the receiving table 34. Once the receiving table has received a sufficient number of bales the power source thereof, hydraulic cylinder 156, is actuated causing the bales disposed thereon to be deposited on the front portion of the unloading or transfer table 54. The receiving table 34 continues to receive bales from the bale loader and deposit the bales on the unloading or transfer table until a tier of bales has been formed thereon. Once the tier is completely formed on the unloading or transfer table 54, the table is then powered from a generally horizontal normal position (FIG. 8) to a substantially vertical position such that the tier carried thereby is deposited on the front portion of the load rack 60. Tiers are continually formed on the unloading or transfer table 54 and deposited on the load rack 60 until a stack of bales comprised of a plurality of side by side tiers are situated on the load bed 60.

Figure 17:
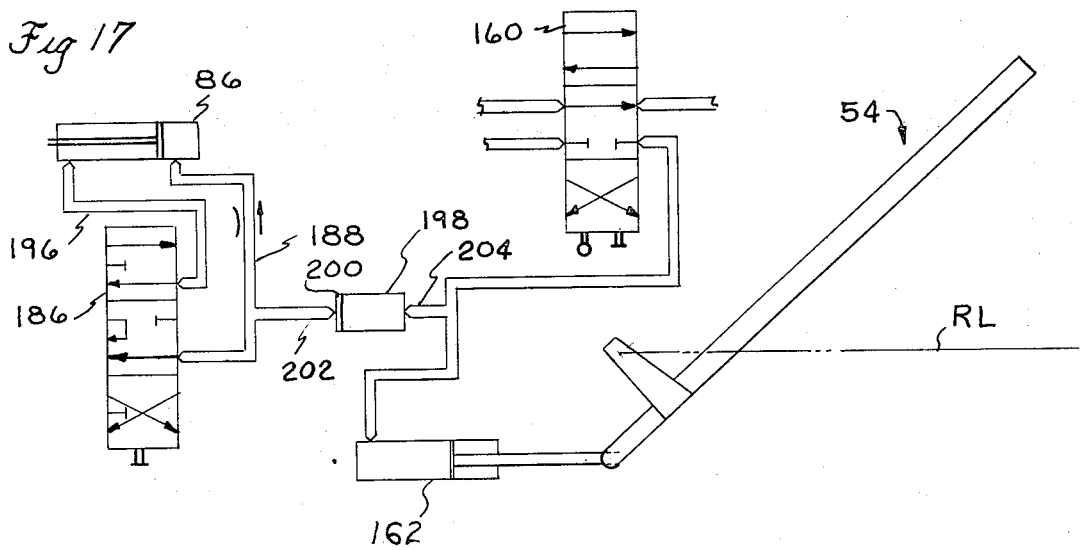
FIGS. 17–19 are fragmentary hydraulic circuitry diagrams showing the particular relationship between selected components of the hydraulic control system.
Figure 18:
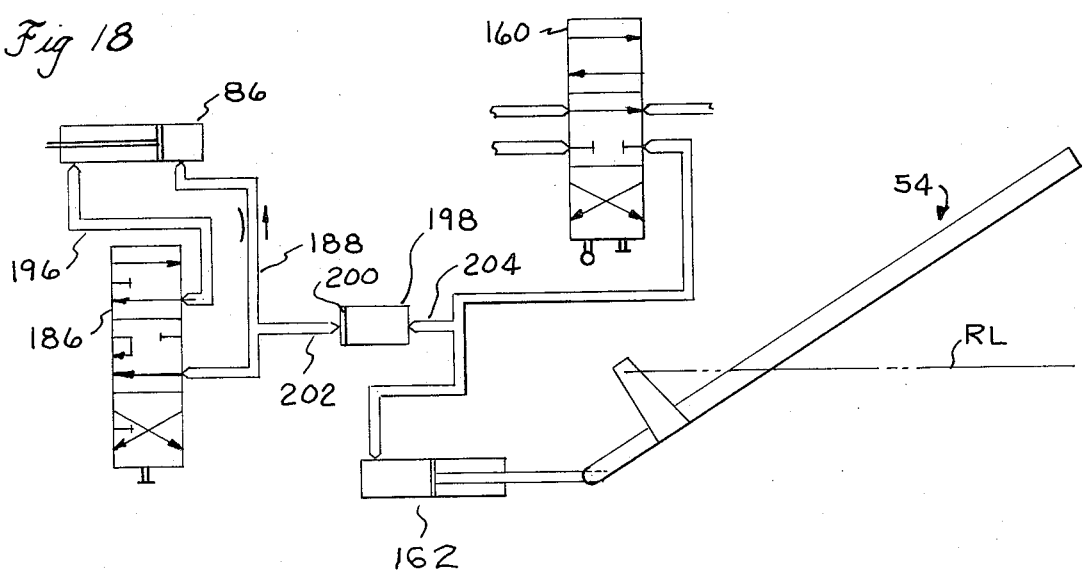
Figure 19:
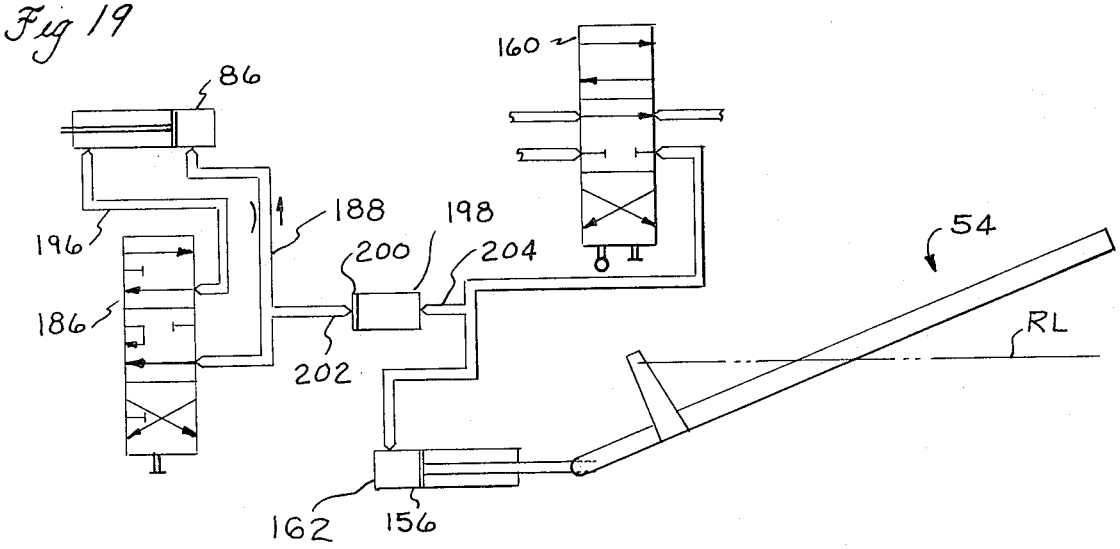

In the single bale unloading operation it should be appreciated that the load rack supports a plurality of side-by-side tiers and that it is the general objective to transfer a tier at a time to the unloading table 54 where bales of the tier are single bale unloaded therefrom. But before the actual single bale unloading operation can be started and in accordance with the present invention it is necessary to set the unloading table at the desired angle which establishes the tier unloading position. With attention being directed to FIGS. 17-19 it is seen that the unloading table 54 is stationed at three different angles relative to a reference line RL. To raise the unloading table to the desired angle, the second table control valve 160 is manually shifted to the up position, as viewed in FIGS. 16-19, causing fluid to be diverted into the anchor end of the unloading table cylinder 162 and consequently causing the table to pivot upwardly. It is particularly seen in FIGS. 17-19 that the flow of fluid is constrained to enter the anchor end of the unloading table cylinder 162 because fluid cannot escape through the metering device 198. Once the desired angle is reached the second table control valve 160 is manually shifted back to the center position, thereby blocking the flow of oil and causing a selected volume of fluid to be trapped in the unloading table cylinder 162. If the angle of the unloading table 54 is too great, this can be corrected by simply shifting the valve to the down position and allowing a portion of the fluid trapped in the cylinder 162 to drain therefrom. Therefore, it is clear from observing FIGS. 17-19 that the angle of the unloading table 54 relative, in this case, to reference line RL is proportional to the volume of fluid trapped in the anchor end of cylinder 162.

Figure 10:
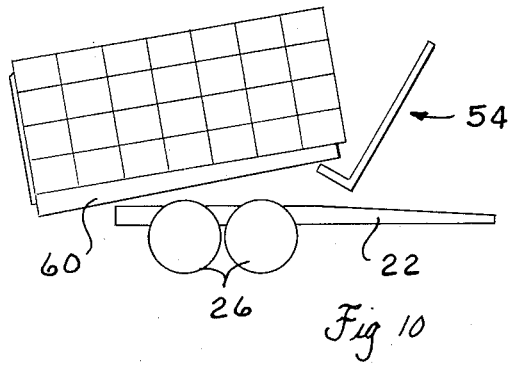
Figure 11:
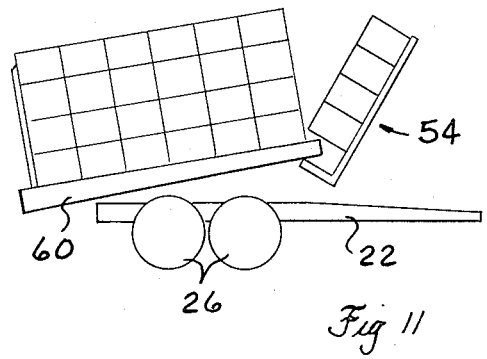
Figure 12:
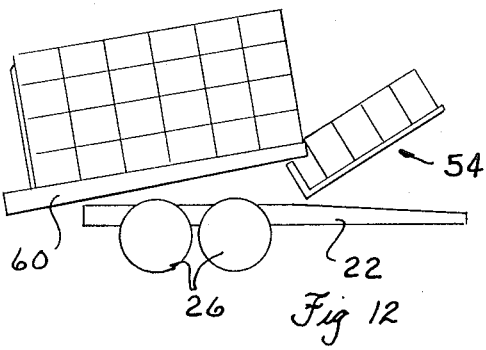

To begin the single bale unloading operation, control valve 186 is shifted to its down position as viewed in FIG. 16 by either control handle 214 or 230. Therefore, with reference to FIG. 16, fluid is diverted from line 182 into line 188. Because of the flow restricting device 194, fluid in line 188 is directed into line 202 and against the piston 200 of the metering device 198. The volume of fluid in the metering device is consequently displaced through line 204 into the anchor end of the unloading table hydraulic cylinder 162. The displaced fluid from the metering device 198 causes the unloading table to pivot from the selected tier unloading position back up towards the stack to a tier receiving position. It will be observed that the magnitude of movement from the tier unloading position to the tier receiving position is limited by the volume of fluid in the metering device 198 or the space available to be filled in the cylinder 162 when disposed in the selected tier unloading position. Once the unloading table has reached the tier receiving position (FIG. 10), there is sufficient pressure build-up to overcome the flow restricting device 194 in line 188. Thus, fluid is then diverted into the anchor end of rolling rack cylinder 86, causing the rolling rack to move forward and push a single tier onto said unloading table 54 (FIG. 11). Once the tier has been received by the unloading table the particular control handle, 214 or 230, is slightly stroked away from valve 186 (FIG. 3), allowing valve 186 to be spring centered. At this point the weight of the tier causes the unloading table to fall smoothly to the selected tier unloading position (FIG. 12), with the volume of fluid used to move the table from the tier unloading position to the tier receiving position being generally trapped between the piston 200 of the metering device 198 and the anchor end of cylinder 162.

Figure 13:
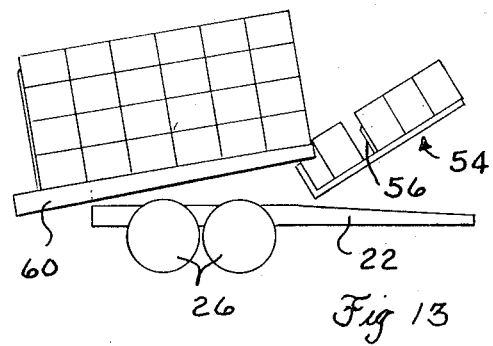
Figure 14:
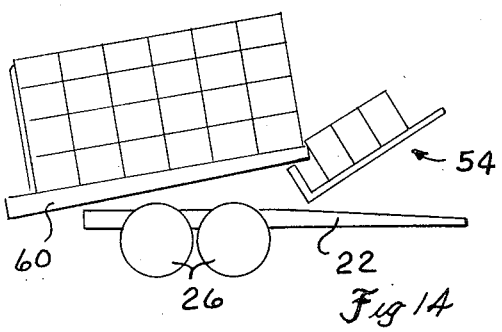
Figure 15:
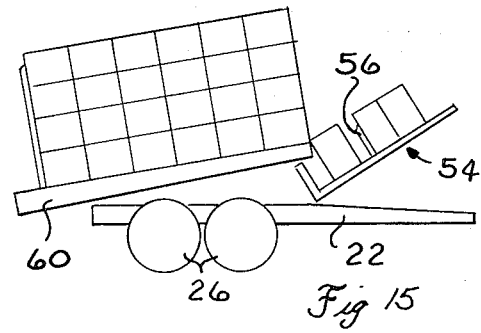

Once the unloading table 54 reaches the tier unloading position, either control handle 214 or 230 is utilized to actuate control valve 206 which controls the flow of fluid into orbit motor 120 which in turn drives the cross conveyor 116. As previously described the cross conveyor controls the bale separating hooks 58 through an actuator plate 126 and a cam 138 as the cross conveyor is driven by the motor 120. Keeping in mind the general operating principals of the bale separating hooks and the control mechanism therefore, as has already been described, it will be appreciated that when as the cross conveyor begins to turn the bale separating hooks 58 are actuated causing the hooks to project up through the openings 56 in the unloading table and engage a portion of the tier disposed thereon. As seen in FIG. 13, the bale separating hooks 58 separate a group of layers of the tier from one single layer such that the single layer may be conveyed by the cross conveyor 116 from the unloading table, allowing the bales to fall from the unloading table one bale at a time. Once the single layer has been conveyed from the unloading table the bale separating hooks are then retracted allowing the complement of the tier to slide down onto the cross conveyor (FIG. 14). After the tier has moved down on the unloading table again the particular timing of the cross conveyor 116 again actuates the bale separating hooks which again separates a series of layers of the tier from the lowermost single layer. And in the same manner as described above, the lowermost single layer is conveyed from the bale wagon one bale at a time. The steps illustrated in FIGS. 13–15 are continued until the complete tier is unloaded from the unloading table 54.

To retrieve another tier from the load bed 60, the control valve 186 is again manually actuated causing the unloading table to recycle from the selected tier unloading position to a tier receiving position at which point the rolling rack is actuated in response to the unloading table reaching the tier receiving position and causes a tier to be pushed from the load bed onto the unloading table once again. After the unloading table has fallen to the tier unloading position (FIG. 12), the tier is once again separated and unloaded as previously described.

Therefore, in summary, the present invention makes two substantial contributions to advancing the art in single bale unloading. The first contribution is the operable association of the control means with the unloading table so as to selectively station the unloading table at an infinite number of positions to accommodate single bale unloading. This allows the operator to position the unloading table according to the circumstances and situations around his farmstead and particularly in accordance to the ground terrain surrounding the single bale unloading site. The second basic contribution of the control means of the present patent disclosure relates to the recycling of the unloading table from a tier unloading position to a tier receiving position closely adjacent the stack such that when the tier departs the load bed, the tier does not have to fall through a substantial space but simply tips slightly over onto the unloading table 54. This particular feature of the present invention is of great significance in the larger capacity bale wagons where the individual tier being transferred is very massive and creates substantial problems when one attempts to allow the tier to free fall through a substantial distance from the load bed to a lowered unloading table.

The terms, "upper," "lower," "forward," "rearward" etc. have been used herein merely for the conveniences of the foregiong specification and in the appended claims to describe the bale wagon and its parts as oriented in the drawings. It is to be understood, however, that these terms are in no way limiting to the invention since the bale wagon may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. In a loading and single bale unloading bale wagon, the combination comprising a main frame; a load bed mounted on said frame for supporting a stack of bales; an unloading table movably mounted adjacent the load bed; means for transferring a tier from said load bed and depositing said tier upon said unloading table; means associated with said unloading table for removing bales one at a time from each tier of bales received by the unloading table; means for moving and stationing said unloading table at of an infinite number of selected positions for performing the single bale unloading operation; and a control means operably associated with said moving and stationing means of the unloading table, said control means being capable upon activation of automatically controlling the movement of the unloading table from the selected bale unloading position to a tier receiving position and said control means further adapted to automatically activate said tier transferring means upon the arrival of the unloading table at the tier receiving position.

2. In a loading and single bale unloading bale wagon, as recited in claim 1, wherein said means for moving and stationing said unloading table includes a hydraulic cylinder having one end anchored to said main frame and a piston slideably contained therein with a rod extending therefrom through the end of said cylinder opposite said anchor end, said rod end operatively connected to said unloading table for moving the same in response to the axial movement of said piston; and wherein said means for moving and stationing said unloading table is operably associated with said control means to selectively trap different volumes of fluid between said piston and the anchor end of said cylinder.

3. In a loading and single bale unloading bale wagon, as recited in claim 2, wherein said unloading table is pivotally mounted adjacent one end of said load bed, and wherein movement of the unloading table is defined as being from a first generally horizontal layer receiving position to a second intermediate selected position for performing the single bale unloading operation to a third generally upright tier receiving position, said unloading table being disposed in close proximity to the end tier of the stack supported by said load bed when in said third position.

4. In a loading and single bale unloading bale wagon, as recited in claim 3, wherein said control means are provided to control the movement of said unloading table from a second intermediate selected position to a third generally upright tier receiving position spaced near the end tier of said stack, and wherein said control means are further provided to control the movement of said tier transferring means in response to said unloading table reaching the tier receiving position, thereby causing a tier at a time to be pushed from said load rack onto said nearby spaced unloading table.

5. In a loading and single bale unloading bale wagon, as recited in claim 4, wherein said control means for controlling the movement of said unloading table to the tier receiving position and activating the means for transferring a tier at a time from the load rack to said unloading table in response to the unloading table reaching the tier receiving position comprises a rolling rack movably mounted for longitudinal movement along said load rack and adapted to push a tier at a time off the load bed onto said unloading table, a rolling rack control valve operatively connected to a rolling rack hydraulic power source; a hydraulic metering device operatively interconnected between the rolling rack control valve and the anchor end of the hydraulic cylinder of the unloading table; a control valve operatively connected to the hydraulic cylinder of the unloading table, and flow restricting means associated with said rolling rack hydraulic power source for assuring that fluid will first be diverted into said hydraulic metering device, actuating said unloading table cylinder and consequently pivoting the unloading table from the selected single bale unloading position to said tier receiving position, at which time sufficient pressure is built up to overcome said flow restricting means so that fluid is directed to said rolling rack power source, causing said rolling rack to move toward said unloading table, pushing a tier at a time onto said unloading table.

6. In a loading and single bale unloading bale wagon, as recited in claim 4, wherein said means for moving and stationing said unloading table includes a hydraulic cylinder anchored at one end to said chassis structure and having an axially mounted piston with a rod extending outwardly from the end of said cylinder opposite said anchored end, said rod being operatively connected to said unloading table for moving the same between said generally horizontal and vertical positions in response to the movement of said piston; and wherein said control means includes a control valve operatively connected to said hydraulic cylinder for directing fluid to and from said cylinder, said control valve further including means for trapping selected volumes of fluid between said piston and the anchor end of said cylinder, thereby extending said rod from said cylinder in proportion to the volume of fluid trapped, whereby the volume of fluid trapped determines the position of the unloading table.

7. In a loading and single bale unloading bale wagon, as recited in claim 6, wherein said means for transferring a tier at a time to said unloading table comprises a rolling rack movably mounted for fore-and-aft movement in the direction of said unloading table, and wherein means are provided for moving and stationing the unloading table at a selected single bale unloading position said means being further capable to move said unloading table up from the selected unloading position to a tier receiving position, said unloading table when disposed in the tier receiving position being generally closer to an end tier of said stack than when in the unloading position; and wherein a control means is provided to control and coordinate the movement of the moving and stationing means of the unloading table with the movement of the rolling rack so that said rolling rack will be activated and move towards said unloading table in response to said unloading table reaching said tier receiving position, whereby a tier at a time is pushed from said load rack onto said unloading table.

8. In a loading and single bale unloading bale wagon, as recited in claim 7, wherein said rolling rack is powered fore-and-aft in the direction of said unloading table by a second hydraulic cylinder, and wherein the control means for controlling the movement of said unloading table from the selected single bale unloading position to the tier receiving position and controlling the movement of said rolling rack towards said unloading table in response to said unloading table reaching said tier receiving position comprises a hydraulic circuit having a series of components including a rolling rack control valve operatively connected to said second hydraulic cylinder, a control valve operably associated with the hydraulic cylinder which operates the unloading table, a metering device interconnected between the rolling rack control valve and the control valve associated with the moving and stationing means of the unloading table, said metering device normally containing a selected volume of fluid and provided with a piston operative to displace fluid therefrom; said hydraulic circuit further including flow restricting means to said second hydraulic cylinder such that flow from said rolling rack control valve is first diverted into said metering device so as to act against said piston, causing a volume of fluid contained therein to be displaced which results in the piston of said unloading table cylinder being displaced also, the displacement of the piston of the unloading cylinder resulting in the movement of said unloading table from the selected unloading position to said tier receiving position; once said unloading table has reached said tier receiving position the pressure build-up against the piston of said metering device being sufficient to overcome said flow restricting means to said second hydraulic cylinder such that fluid is then diverted into said second hydraulic cylinder, thereby moving the piston contained within said second hydraulic cylinder causing actuation of the rolling rack and moving it forward, whereby a tier at a time is pushed from said load rack onto said unloading table.

9. In a loading and single bale unloading bale wagon comprising in combination: a frame; a load bed mounted on said frame for supporting a stack of bales, said load bed including a terminal edge; an unloading table movably mounted adjacent the terminal edge; means for transferring a tier from said stack contained on said load bed and depositing said tier upon the unloading table; means associated with said unloading table for removing bales one at a time from each tier received by the unloading table; means for moving and stationing said unloading table at any one of an infinite number of selected positions for performing the single bale unloading operation; and a control means operably associated with said moving and stationing means of the unloading assembly, said control means being capable upon activation of automatically controlling the movement of the unloading table from its selected bale unloading position to a tier receiving position, the tier receiving position of the unloading table being generally closer to said load bed than the selected single bale unloading position, said control means automatically activating the tier transferring means in response to the unloading table being positioned at the tier receiving position and returning the unloading table to said selected unloading position.

10. In a loading and single bale unloading bale wagon, as recited in claim 9, wherein said means for transferring a tier one at a time from the stack to said unloading table comprises: a rolling rack moveably mounted for fore-and-aft movement in the direction of said unloading table; a hydraulic cylinder operatively connected to said rolling rack for powering the same; and wherein said unloading table is pivotally mounted adjacent the unloading terminal edge of said load bed and is pivoted between the unloading position and the tier receiving position by another hydraulic cylinder; and wherein said control means for actuating and controlling said tier transfer means upon the arrival of the unloading table to the tier receiving position comprises a hydraulic circuit having a series of components including a rolling rack control valve particularly adapted to direct fluid into the rolling rack cylinder, a metering device in fluid communication with said rolling rack control valve, the rolling rack cylinder and the unloading table control valve, said metering device adapted to contain a selected volume of fluid and includes a piston axially mounted therein for displacing selected volumes of fluid therefrom, said hydraulic circuit further including means restricting flow to said rolling rack cylinder such that the flow of fluid from said the rolling cylinder is first diverted from the unloading table control valve into said metering device which results in the piston contained therein displacing a volume of fluid which enters the unloading table cylinder resulting in the unloading table moving from the selected single bale unloading position to the tier receiving position at which time substantial pressures are built up which overcome the flow restricting device such that flow is then diverted from the unloading table control valve into the rolling rack cylinder causing the rolling rack to move towards said unloading table and to therefore push a tier at a time from said load bed onto said unloading table.

11. In a single bale unloading bale wagon having a wheel supported chassis structure; a generally flat load bed for supporting a stack of bales comprised of a plurality of tiers disposed in side-by-side relationship; an unloading table pivotally mounted adjacent one end of said load bed, said unloading table adapted to assume an unloading position angularly spaced from the adjacent end tier of the stack; a hydraulic cylinder operatively connected to said unloading table for pivotally moving the same; a rolling rack movably mounted for fore-and-aft movement in the direction of said unloading table; a rolling rack cylinder operatively connected to said rolling rack for moving the same in the direction of said unloading table, whereby said rolling rack is operative to push said stack towards said unloading table, thereby causing a tier at a time to depart said load rack; means associated with said unloading table for unloading bales therefrom; the improvement comprising a control means for automatically coordinating and controlling the transfer of a tier at a time from said load bed to said unloading table in response to the repositioning of said unloading table from its unloading position to a tier receiving position generally closer to the forward most tier on the load bed, said control means comprising means operably associated with the hydraulic cylinder connected to the unloading table for actuating said unloading table cylinder such that said unloading table is pivoted from said unloading position to a tier receiving position, said unloading table assuming a position closer to the end tier of said stack when in said tier receiving position; and means for actuating said rolling rack cylinder and moving said rolling rack towards said unloading table in response to the unloading table assuming the tier receiving position, whereby the end tier adjacent said unloading table is pushed from said load bed onto the unloading table, thereby transferring the end tier from said load bed to said unloading table without requiring the tier to fall to the unloading position.

12. A bale wagon, as recited in claim 11, wherein said control means for controlling the movement of said unloading table from said unloading position to said tier receiving position and controlling and actuating said rolling rack in response to said unloading table reaching said tier receiving position comprises a hydraulic control system including: a rolling rack control valve; means interconnecting said rolling rack control valve with said rolling rack cylinder; a control valve operably associated with the hydraulic cylinder of the unloading table; a metering device interconnected between said unloading table cylinder control valve and said means interconnecting said rolling rack control valve and said rolling rack cylinder, said metering device adapted to contain a selected volume of fluid and including a piston therein for displacing said fluid contained therein towards said unloading table cylinder; and flow restricting means associated with said rolling rack cylinder for restricting the flow of fluid thereto until fluid is first diverted to said metering device which results in a volume of fluid being displaced therefrom by the piston therein, the displaced fluid from the metering device being directed towards said unloading table cylinder causing the unloading table to pivot from the unloading position to the tier receiving position at which time sufficient pressure is built up to overcome said flow restricting means associated with said rolling rack cylinder, thereby allowing fluid to enter said rolling rack cylinder and move the rolling rack towards said unloading table, whereby a tier at a time is pushed from said load bed onto the unloading table which is at the tier receiving position.

* * * * *

UNITED STATES PATENT OFFICE
CERTIFICATE OF CORRECTION

Patent No. 3,804,267        Dated April 16, 1974

Inventor(s) Albert C. Cook and Conald M. Grey

It is certified that error appears in the above-identified patent and that said Letters Patent are hereby corrected as shown below:

Claim 10, Column 17:

line 47, delete "cylinder" and insert therefor --rack control valve--, line 47, delete "from the un-"; and line 48, delete "loading table control valve".

Signed and sealed this 12th day of November 1974.

(SEAL)
Attest:

McCOY M. GIBSON JR.　　　　　　　　C. MARSHALL DANN
Attesting Officer　　　　　　　　　　Commissioner of Patents